(12) United States Patent
Parker

(10) Patent No.: US 6,315,488 B1
(45) Date of Patent: Nov. 13, 2001

(54) SNAP-IN HANDLE ASSEMBLY FOR A TOOL

(75) Inventor: Thomas W. Parker, Columbus, OH (US)

(73) Assignee: UnionTools, Inc., Columbus, OH (US)

( * ) Notice: Subject to any disclaimer, the term of this patent is extended or adjusted under 35 U.S.C. 154(b) by 0 days.

(21) Appl. No.: 09/369,882

(22) Filed: Aug. 9, 1999

(51) Int. Cl.⁷ .............................. A01D 7/00; B25G 3/18
(52) U.S. Cl. ..................... 403/329; 403/326; 403/361; 56/400.01; 56/400.17
(58) Field of Search ................ 403/321, 322.1, 403/326, 329, 359.1, 359.5; 56/400.01, 400.17, 400.18; 16/422, DIG. 4; 15/145

(56) References Cited

U.S. PATENT DOCUMENTS

| 208,749 | 10/1878 | McCann . | |
|---|---|---|---|
| D. 279,349 | 6/1985 | Clivio et al. | D8/13 |
| D. 311,310 | 10/1990 | Clivio | D8/13 |
| 588,595 | * 8/1897 | Nolan | 403/329 |
| 1,933,636 | * 11/1933 | Montan | 56/400.17 |
| 2,322,947 | * 6/1943 | Litwin et al. | 403/361 |
| 3,686,896 | * 8/1972 | Rutter | 285/423 |
| 3,853,416 | * 12/1974 | Hanan | 403/329 |
| 3,927,435 | * 12/1975 | Moret et al. | 403/322 |
| 4,224,786 | 9/1980 | Langlie et al. | 56/400.01 |
| 4,402,626 | * 9/1983 | Recker | 403/328 |
| 4,441,747 | 4/1984 | Bryington, II | 294/51 |
| 4,906,122 | * 3/1990 | Barrett et al. | 403/305 |
| 5,168,693 | 12/1992 | Ingvardsen | 56/400.04 |
| 5,172,447 | 12/1992 | Tomm | 15/159.1 |
| 5,579,848 | 12/1996 | Hsu | 172/378 |
| 5,816,633 | 10/1998 | Odom | 294/59 |
| 5,890,254 | 4/1999 | Courtney et al. | 15/145 |
| 5,898,172 | * 4/1999 | Masui et al. | 403/329 |

FOREIGN PATENT DOCUMENTS

| 748024 | * 4/1933 | (FR) | 403/326 |
|---|---|---|---|
| 9853 | * of 1910 | (GB) | 403/326 |

* cited by examiner

Primary Examiner—Lynne H. Browne
Assistant Examiner—Ernesto Garcia
(74) Attorney, Agent, or Firm—Brobeck Phleger & Harrison LLP

(57) ABSTRACT

A coupling device for connecting a handle part and a tool part includes a plug and a socket. The plug has a main portion, an end portion, and a notched portion between the main portion and the end portion. The socket has a proximal base end, a body portion, and a locking member. The body portion extends from the base end and has an axial, plug receiving bore that opens through a distal end of the body portion. The locking member is positioned between the base end and the plug receiving bore. The locking member includes a leaf spring cantilevered axially on one side of the body portion of the socket. The leaf spring supports a latch bar that engages the notched portion of the plug when the plug is inserted through the open end of the plug receiving bore. The latch bar is spaced from the leaf spring so that the end portion of the plug passes between the latch bar and the leaf spring when the plug is inserted through the open end of the plug receiving bore. The latch bar is released from the notched portion of the plug when the leaf spring is depressed inwardly from the one side of the socket body.

19 Claims, 6 Drawing Sheets

SNAP-IN HANDLE ASSEMBLY FOR A TOOL

BACKGROUND OF THE INVENTION

1. Field of the Invention

The present invention relates to a snap-in handle assembly for a tool. More particularly, the present invention relates to a snap-in handle assembly allowing easy attachment of a tool handle to a tool head.

2. Description of Related Art

Tool handles are available in a wide variety of shapes, sizes, and compositions. For example, handles may be straight or curved with a hand grip at one end and a tool head at the opposite end. Handles also may be constructed from plastic, metal, fiberglass, wood, and the like. Tool heads are available in a large variety of shapes, sizes, and compositions, depending to some extent on the tool's function. In this regard, tool heads may be formed as rakes, hoes, brooms, shovels, pitchforks, and the like.

Generally, tool handles and tool heads are manufactured separately and are connected together in a subsequent assembly process. One known method for connecting a tool handle with a tool head is to press-fit a tapered end of the tool handle into a socket or bore formed in the tool head. Since the tool handle can easily become dislodged from the tool head in this arrangement, it is common to nail or staple the tool head and tool handle together to prevent their separation.

Another known method for attaching a tool handle to a tool head to prevent separation is to form threads within the socket or bore of the tool head to mate with complementary threads on the tapered end of the handle. Threading, however, often does not prevent unwanted separation of the tool handle from the tool head, and thus, results in the need for fixedly securing the tool handle to the tool head by nailing or stapling.

Although tool handles and tool heads are often manufactured separately and need to be coupled together as described above, most are assembled when sold. Thus, consumers' choices are limited to the products that manufacturers decide to manufacture, assemble, and sell. It is not economically feasible for manufacturers to provide all possible combinations of shapes, sizes, and compositions for each type of tool head and tool handle. Thus, manufacturers generally offer a limited number of combinations. Further, when a tool handle breaks, many consumers discard the entire tool because they cannot easily find a replacement handle having the appropriate size and coupling device to attach to the tool head.

SUMMARY OF THE INVENTION

To overcome the disadvantages of the prior art, and in accordance with the purposes of the invention, as embodied and broadly described herein, there is provided a coupling device for connecting a handle part and a tool part. The coupling includes a plug and a socket. The plug has a main portion, an end portion, and a notched portion between the main portion and the end portion. The socket has a proximal base end, a body portion, and a locking member. The body portion extends from the base end and has an axial, plug receiving bore that opens through a distal end of the body portion. The locking member is positioned between the base end and the plug receiving bore.

In accordance with the present invention, the locking member includes a leaf spring cantilevered axially on one side of the body portion of the socket. The leaf spring supports a latch bar that engages the notched portion of the plug when the plug is inserted through the open end of the plug receiving bore. The latch bar is spaced from the leaf spring so that the end portion of the plug passes between the latch bar and the leaf spring when the plug is inserted through the open end of the plug receiving bore. The latch bar is released from the notched portion of the plug when the leaf spring is depressed inwardly from the one side of the socket body.

In a preferred embodiment, the leaf spring is cantilevered from the base end of the socket, and the latch bar is supported from the leaf spring by a pair of arms. The two arms are spaced from each other so that the end portion of the plug passes between the arms when the plug is inserted through the open end of the plug receiving bore.

Additionally, the socket preferably is a one-piece unit molded of synthetic resinous material, and the leaf spring is delineated by a U-shaped slot in the body portion.

BRIEF DESCRIPTION OF THE DRAWINGS

The accompanying drawings, which are incorporated in and constitute part of the specification, illustrate a presently preferred embodiment of the invention and, together with the general description given above and detailed description of the preferred embodiments given below, serve to explain the principles of the invention.

DESCRIPTION OF THE PREFERRED EMBODIMENTS

Reference now will be made in detail to the present preferred embodiments of the invention, examples of which are illustrated in the accompanying drawings, in which like numerals designate like elements.

Figure 1:
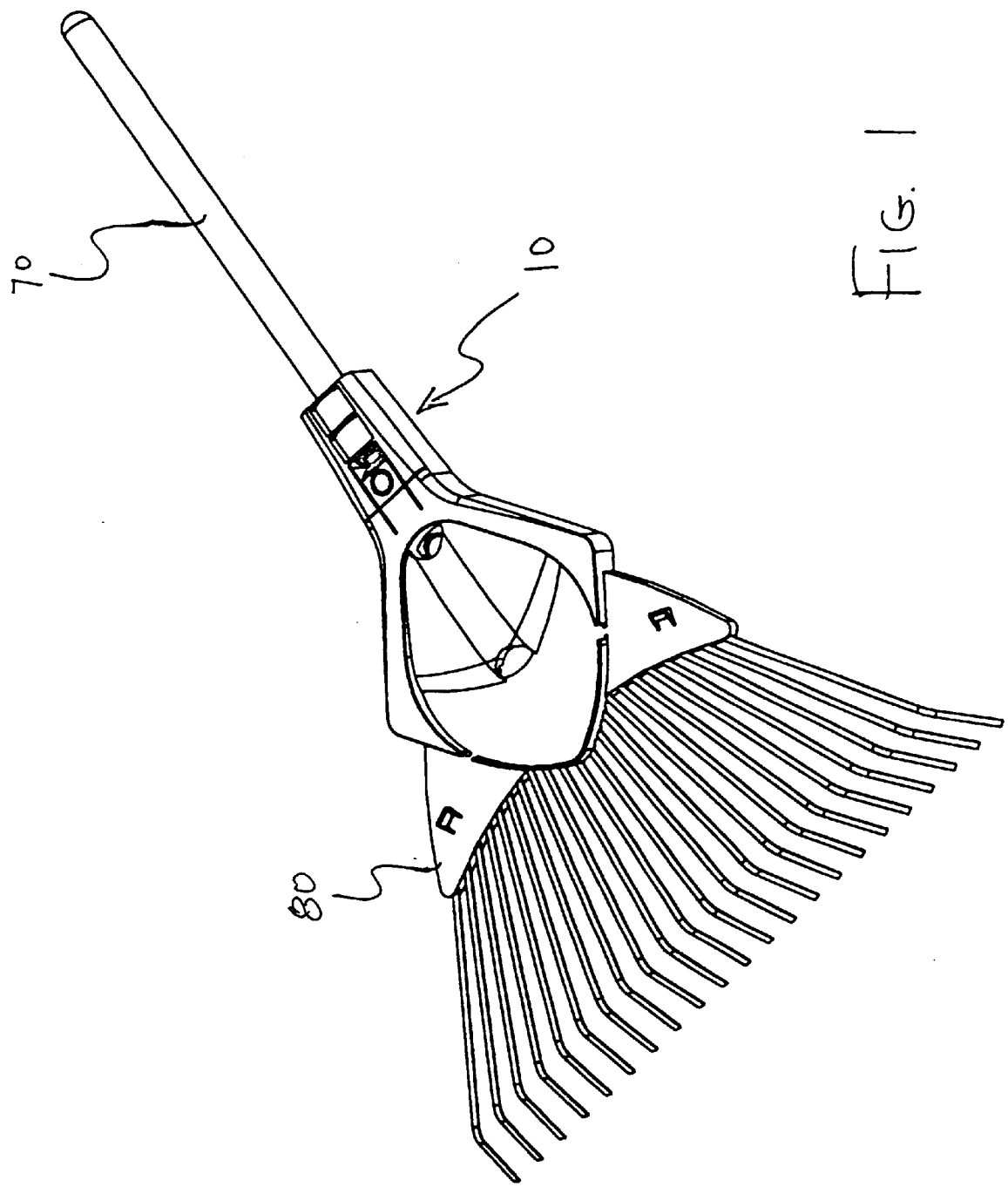
FIG. 1 is a perspective view of a preferred embodiment of a coupling device according to the invention.

In accordance with the present invention, there is provided a coupling device for connecting a tool handle to a tool head. As embodied herein and shown in FIGS. 1 and 2, the present invention includes a coupling device 10 adapted to connect a tool handle 70 to a tool head 80. In a preferred embodiment, the tool handle 70 may be a straight, wooden handle, and the tool head 80 may be a leaf rake. However, the invention in its broadest sense is not limited by the shape, size, composition, or type of tool handle 70 and tool head 80.

Figure 3:
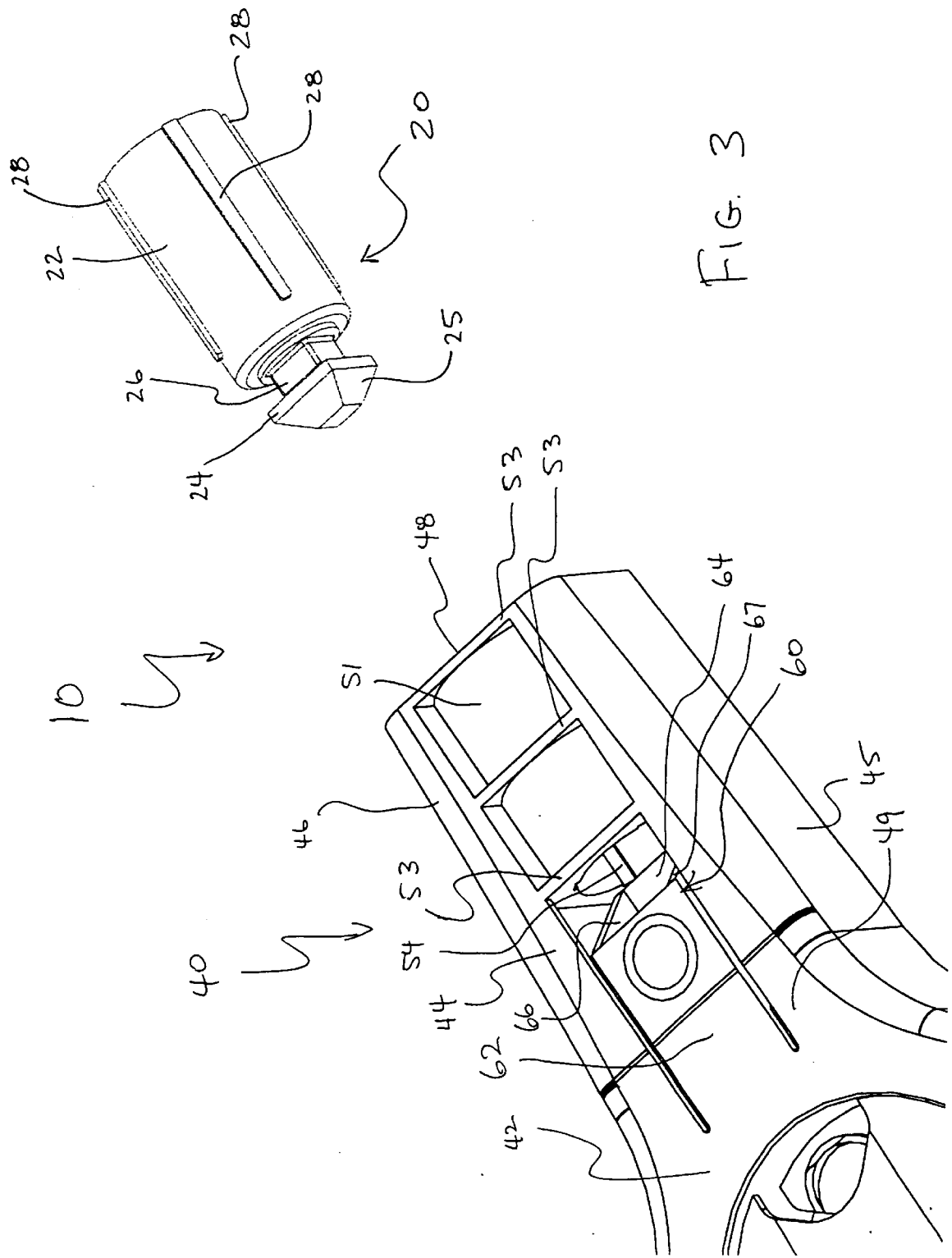
FIG. 3 is a front perspective view of the coupling device illustrated in FIG. 2 in an uncoupled position.

In accordance with the present invention, the coupling device includes a plug and socket assembly. As embodied herein and illustrated in FIGS. 3 and 4, the coupling device 10 includes a plug 20 and a socket 40. The plug 20 comprises a main portion 22, an end portion 24, and a notched portion 26 between the main portion 22 and the end portion 24. As is best shown in FIG. 3, the end portion 24 of the preferred embodiment has angled side walls 25 that form a pyramid shape. Alternatively, the end portion 24 may be another geometric shape, such as a sphere, hemisphere, cube, or the like.

Figure 4:
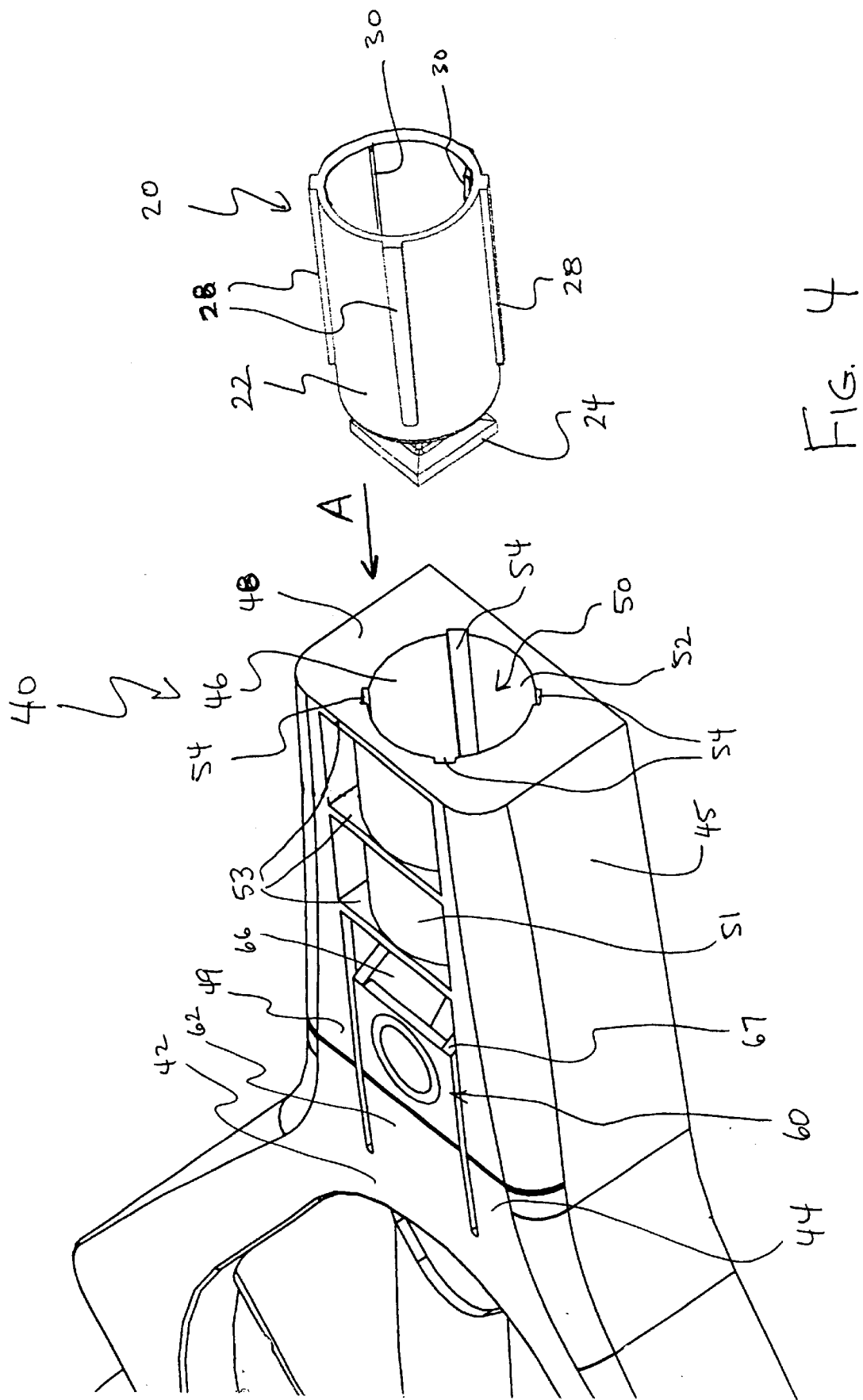
FIG. 4 is a right perspective view of the coupling device illustrated in FIG. 2 in an uncoupled position.

As shown in FIGS. 3 and 4, the main portion 22 is preferably a substantially circular cylinder. Although the main portion 22 is depicted as a substantially circular cylinder in the illustrated embodiment, the main portion 22 may be formed as any geometric shape, such as an oval, a square, or the like. Further, the main portion 22 could be formed with an inner cross section different from its outer cross section. For example, the inner cross section of the main portion 22 may be circular while the outer cross section is square.

In a preferred embodiment, it is desirable for the main portion 22 to include longitudinal ribs 28 or the like on its outer surface to prevent relative rotational movement between the plug 20 and the socket 40. The ribs 28 also assist in aligning the plug 20 with the socket 40 prior to coupling. In an alternative embodiment (not shown), the main portion 22 may be provided with any number of ribs, or no ribs at all. Indeed, the main portion 22 may simply have a knurled outer surface (not shown) to restrict rotation between the plug 20 and the socket 40.

Preferably, the notched portion 26 of the plug has a substantially square-shaped cross section that is smaller than the cross sections of the main portion 22 and the end portion 24. However, the notched portion 26 may be formed as another geometric shape, such as a circle, rectangle, or the like. Alternatively, the notched portion 26 may have a circular cross section with one flat side formed by a chord of the circle.

The plug 20 may also include one or more internal longitudinal ribs 30, as illustrated in FIG. 4. The internal ribs 30 provide a press-fit relationship between the plug 20 and the tool handle 70. Additionally, the plug 20 and the tool handle 70 may be fixedly attached together by nailing, stapling, or the like.

The socket 40 includes a proximal base end 42 and a body portion 44 extending from the proximal base end 42. The body portion 44 includes two side walls 45, 46 extending from the proximal base end 42 to a distal end 48 of the body portion 44. The body portion 44 also has an axial, plug receiving bore 50 that is defined by an upper curved wall 51, a lower curved wall 52, and the two side walls 45, 46. The body portion 44 also has transverse walls 53 extending between the two side walls 45, 46 on the outside of the upper and lower curved walls 51, 52.

The bore 50 opens through the distal end 48 of the body portion 44. In the illustrated preferred embodiment, the bore 50 has a circular cross section. However, in an alternative embodiment, the plug receiving bore 50 can have a different cross sectional shape, such as an oval, a square, or the like, as long as the cross section of the bore 50 is complementary to the cross section of the plug 20.

In a preferred embodiment, the walls defining the bore include a plurality of longitudinal grooves 54. There must be at least as many grooves 54 as longitudinal ribs 28 to allow insertion of the plug 20 into the socket 40. The longitudinal grooves 54 cooperate with the longitudinal ribs 28 on the plug 20 to prevent relative movement between the plug 20 and the socket 40 upon coupling. As is best shown in FIG. 4, the grooves 54 and ribs 28 are also configured such that they ensure that the notched portion 26 of the plug 20 will be aligned for proper coupling with the socket 40.

Figure 2:
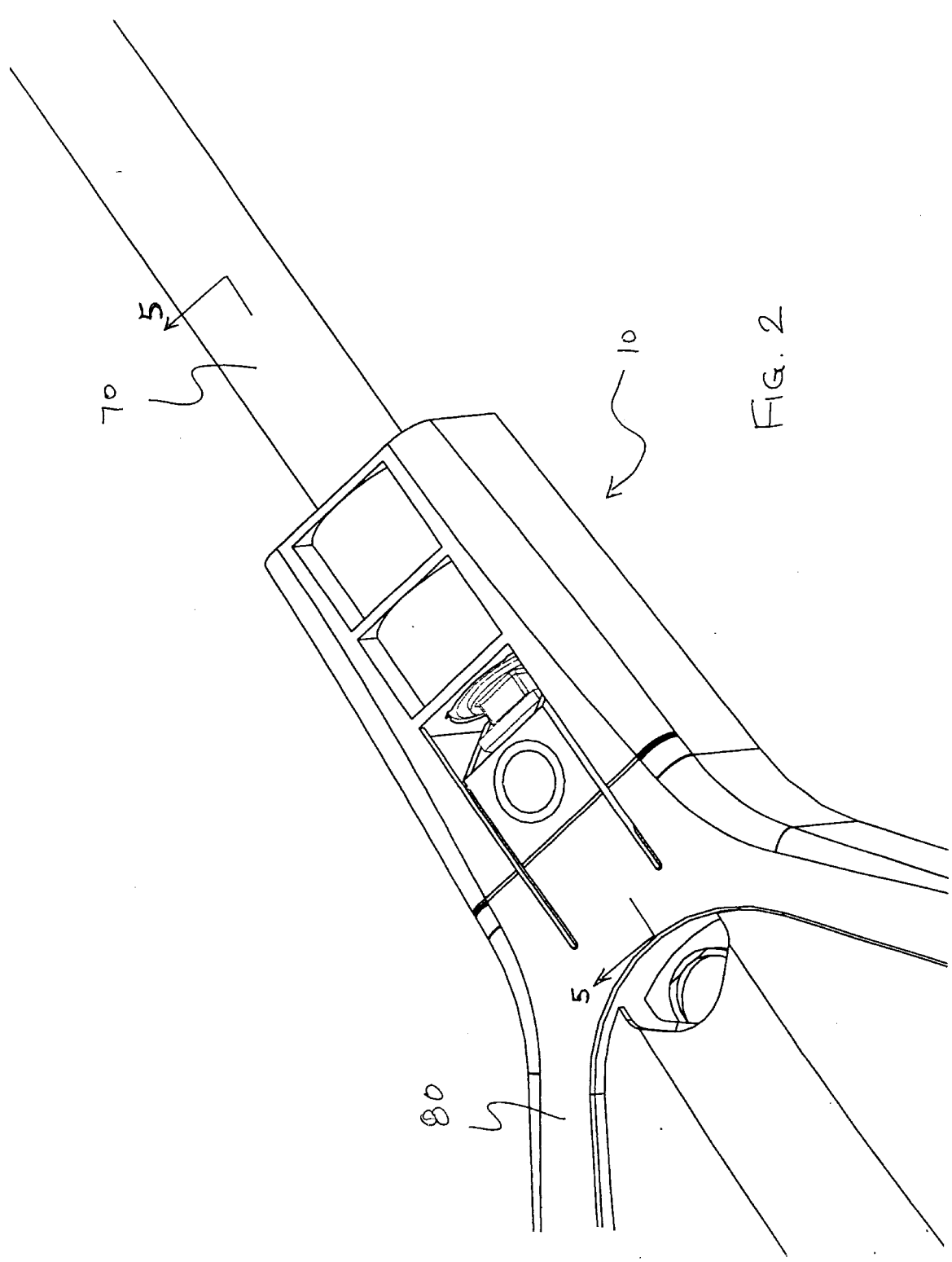
FIG. 2 is a partial view of the coupling device illustrated in FIG. 1.

In accordance with the present invention, the coupling device includes an assembly for locking the plug within the socket. As embodied herein, the locking assembly includes a locking member 60 on the body portion 44 between the proximal base end 42 and the plug receiving bore 50. The locking member 60 preferably includes a leaf spring 62 cantilevered axially on an upper side 49 of the body portion 44 of the socket 40. In the preferred embodiment, as best shown in FIGS. 2–4, the leaf spring 62 is cantilevered from the base end 42 of the socket 40. In an alternative embodiment (not shown), the leaf spring may be cantilevered from the plug receiving bore 50.

Figure 5:
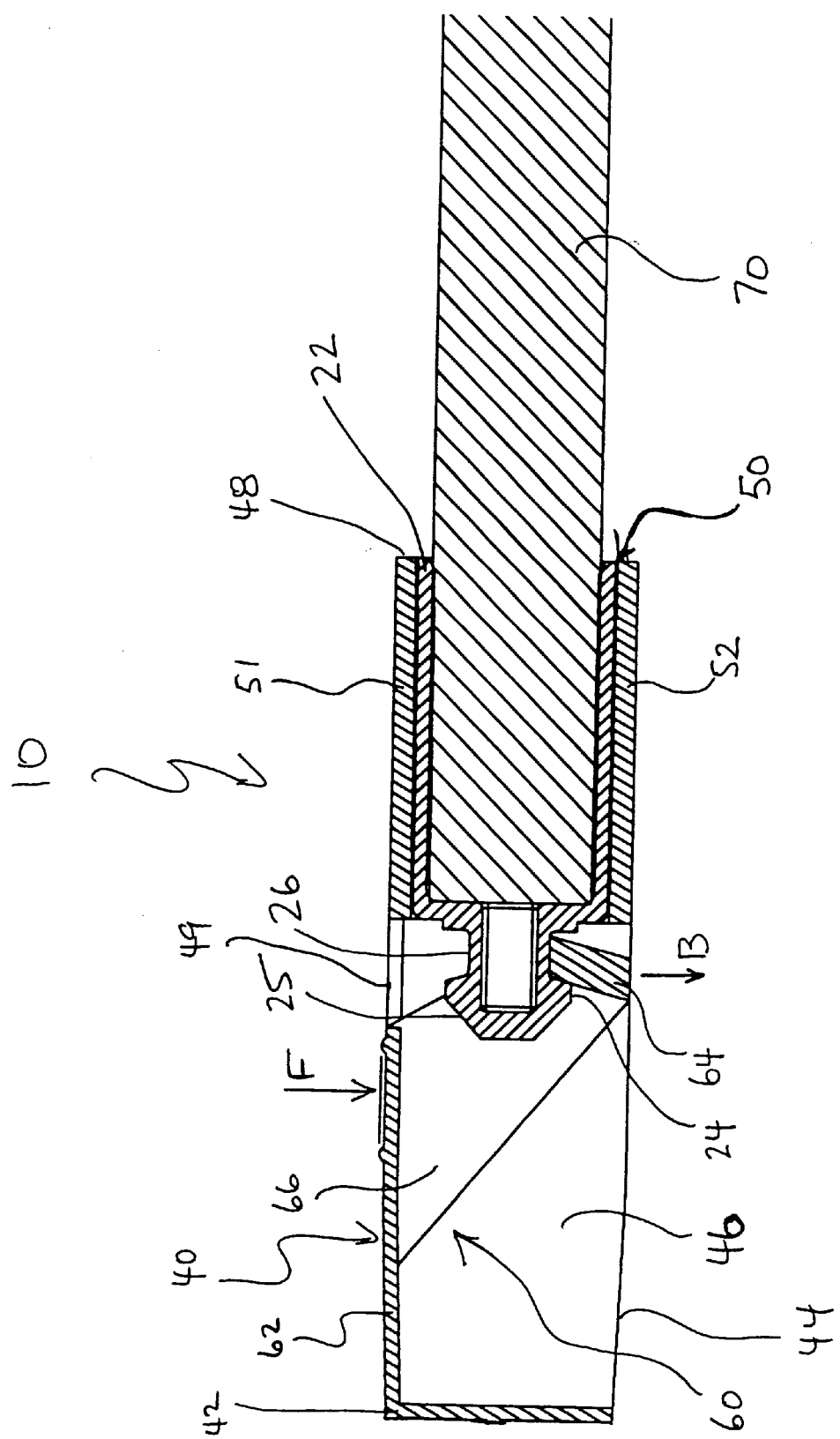
FIG. 5 is a sectional view along line 5—5 in FIG. 2.

As illustrated in FIG. 5, the locking member 60 also may include a latch bar 64. The latch bar 64 is spaced from the leaf spring 62 so that the end portion 24 of the plug 20 can pass between the latch bar 64 and the leaf spring 62 when the plug 20 is inserted into the socket 40. Alternatively, the latch bar 64 may be positioned proximate the leaf spring 62.

In addition, the latch bar 64 is positioned to engage the notched portion 26 of the plug 20 when the plug 20 is inserted into the socket 40. In a preferred embodiment, as shown in FIG. 5, the plug 20 is positioned between the leaf spring 62 and the latch bar 64 when inserted into the socket 40. This configuration minimizes undesired uncoupling of the plug 20 and the socket 40. For example, when a relative pulling force is applied to the plug 20 or the socket 40 without disengaging the latch bar 64, the wall delineating the notched portion 26 and the end portion 24 of the plug 20 will bear against the latch bar 64. Thus, a force will be applied to the latch bar 64 in a direction almost perpendicular to the bias of the leaf spring 62. As a result, the latch bar 64 will tighten the engagement between the latch bar 64 and the notched portion 26 rather than uncoupling the plug 20 and the socket 40.

The latch bar 64 is supported from the leaf spring 62 by a pair of arms 66, 67. As is best shown in FIG. 3, the arms 66, 67 are arranged substantially parallel to one another in the axial direction. The arms 66, 67 are also spaced from each other so that the end portion 22 of the plug 20 can pass between the arms 66, 67 when the plug 20 is inserted into the socket 40. As shown in FIG. 5, the arms 66, 67 are slanted toward the plug receiving bore 50 as they extend away from the leaf spring 62. Alternatively, the latch bar 64 may be supported from the leaf spring 62 by other types of structures, provided that the supporting structures do not impede the insertion path of the plug 20.

As described above, the longitudinal grooves 54 cooperate with the longitudinal ribs 28 to ensure that the plug 20 is properly aligned with the socket 40. In a preferred embodiment, as illustrated in FIGS. 3 and 4, the grooves 54 and ribs 28 also ensure that a flat surface of the notched portion 26 is properly aligned with the latch bar 64.

Furthermore, the longitudinal ribs 28 and grooves 54 may be configured to provide a tight interference fit when the plug 20 is inserted into the socket 40. That is, the ribs 28 may be slightly larger than the grooves 54, laterally and/or radially, such that the ribs 28 and/or the grooves 54 slightly deform to provide the interference fit relationship. The interference fit reduces play and rattle between the handle 70 and the tool head 80. Consequently, the resultant tool feels like a one-piece tool rather than a multi-piece tool.

In a preferred embodiment, as shown in FIG. 5, the latch bar 64 is slanted toward the plug receiving bore 50. Alternatively, the latch bar 64 may be more or less inclined, may slant toward the base end 42 of the socket 40, or may be substantially radially oriented.

Figure 6:
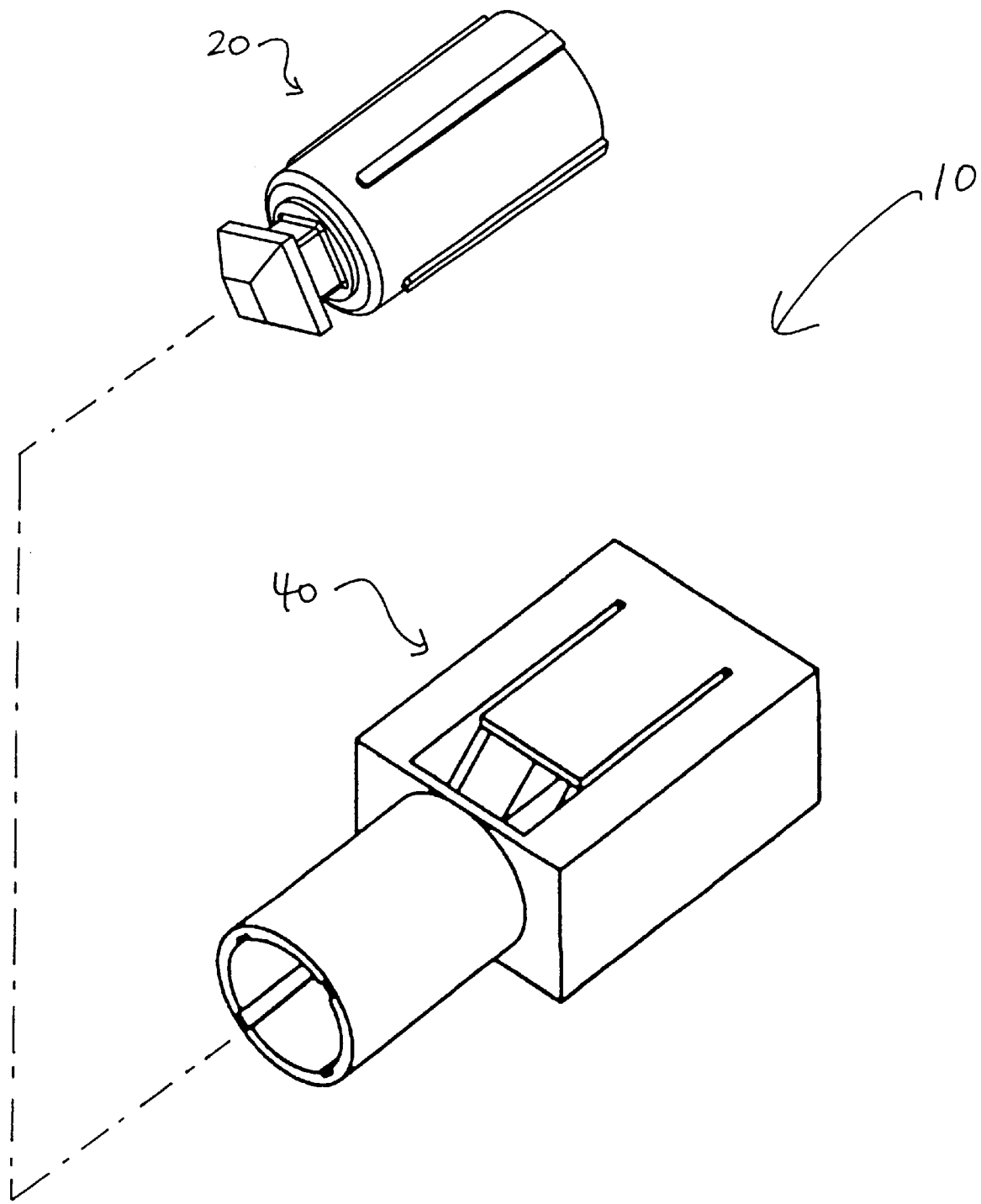
FIG. 6 is a perspective view of a second preferred embodiment of a coupling device according to the invention.

As shown in FIGS. 1–5, the socket 40 is molded as one piece with the tool head 80. In another embodiment, as shown in FIG. 6, the socket 40 may be molded separately from a tool head and connected to a tool head during an assembly process. Conversely, the plug 20 is shown independent of the handle in FIGS. 1–5. However, in an alternative embodiment, the plug 20 may be molded as one piece with a tool handle. Furthermore, in yet another alternative embodiment, the plug 20 may be molded as one piece with a tool head, and the socket 40 can be molded as one piece with a tool handle.

In a preferred embodiment, the plug 20 and the socket 40 are molded of synthetic resinous material. Alternatively, the plug 20 may be fabricated from any material, such as metal, wood, or the like, and the socket 40 may be fabricated from any material with sufficient elasticity to provide the cantilevered leaf spring 62, such as metal.

In operation, the coupling device 10 releasably attaches a tool handle 70 to a tool head 80. The coupling device 10 works by inserting the plug 20 into the socket 40. Before inserting the plug 20, the longitudinal ribs 28 on the outer surface of the plug 20 must be aligned with the longitudinal grooves 54 formed in the walls defining the plug receiving bore 50. The plug 20 is then inserted into the open end 48 of the bore 50 in the direction indicated by A in FIG. 4.

As the plug 20 is inserted, the angled side walls 25 of the end portion 22 of the plug 20 come in contact with the latch bar 64, causing the latch bar 64 to deflect radially outward, as indicated by B in FIG. 5. As the plug 20 is further inserted, the notched portion 26 reaches a position adjacent the latch bar 64. The resiliency of the leaf spring 62 then causes the latch bar 64 to return to a resting position in engagement with the notched portion 26, as illustrated in FIG. 5, thereby coupling the tool handle 70 with the tool head 80.

In order to uncouple the tool handle 70 from the tool head 80, a force F must be applied to the leaf spring 62 as shown in FIG. 5. The force must be sufficient to deflect the leaf spring 62 enough to disengage the latch bar 64 from the notched portion 26 of the plug 20. The force must also displace the latch bar 64 far enough in direction B to allow the end portion 22 of the plug 20 to pass by the latch bar 64 as the plug 20 is pulled from the socket 40 in a direction opposite to direction A. Alternatively, the latch bar 64 or the underside of the leaf spring 62 may be provided with a grasping member (not shown) so that a person could exert a pulling force on the grasping member to displace the latch bar 64 in direction B, as described above.

While this invention has been described with specific embodiments thereof, it is evident that many alternatives, modifications, and variations will be apparent to those skilled in the art. As a result, a plurality of tool heads and tool handles can be interchangeably connected. Thus, consumers are provided with more product choice and lower cost. For example, a consumer can purchase a single tool handle of a preferred length to be used interchangeably with a plurality of tool heads, rather than purchasing a plurality of tool handle/tool head combinations.

Accordingly, the preferred embodiments of the invention as set forth herein is intended to be illustrative, not limiting. Various changes may be made without departing from the spirit and scope of the invention.

What is claimed is:

1. A coupling device for connecting a handle part and a tool part, the coupling comprising:
    a plug having a main portion, an end portion, and a notched portion between the main portion and the end portion;
    a socket having a proximal base end, a body portion extending from the base end, an axial, plug receiving bore opening through a distal end of the body portion, and a locking member between the base end and the plug receiving bore; and
    the locking member including a leaf spring cantilevered axially on one side of the body portion of the socket and supporting a latch bar to engage the notched portion of the plug when the plug is inserted through the open end of the plug receiving bore, the latch bar being spaced from the leaf spring replaced so that the end portion of the plug passes between the latch bar and the leaf spring when the plug is inserted through the open end of the plug receiving bore with an located on another side of the socket.

2. The coupling device of claim 1, wherein the leaf spring is cantilevered from the base end of the socket.

3. A coupling device for connecting a handle part and a tool part, the coupling comprising:
    a plug having a main portion, an end portion, and a notched portion between the main portion and the end portion;
    a socket having a proximal base end, a body portion extending from the base end, an axial, plug receiving bore opening through a distal end of the body portion, and a locking member between the base and the plug receiving bore; and
    the locking member including a leaf spring cantilevered axially on one side of the body portion of the socket and supporting a latch bar to engage the notched portion of the plug when the plug is inserted through the open end of the plug receiving bore, the latch bar being spaced from the leaf spring so that the end portion of the plug passes between the latch bar and the leaf spring when the plug is inserted through the open end of the plug receiving bore;
    wherein the latch bar is supported from the leaf spring by a pair of arms spaced from each other so that the end portion of the plug passes between the arms when the plug is inserted through the open end of the plug receiving bore.

4. The coupling device of claim 1, wherein the socket is a one-piece unit and the leaf spring is delineated by a U-shaped slot in the body portion.

5. The coupling device of claim 4, wherein the socket is molded of synthetic resinous material.

6. The coupling device of claim 1, wherein the body portion of the socket includes two substantially parallel side walls extending from the proximal base end to the distal end of the body portion.

7. The coupling device of claim 6, wherein the body portion includes a top curved wall and a bottom curved wall, the curved walls connecting the parallel side walls to form the plug receiving bore.

8. A coupling device for connecting a handle part and a tool part, the coupling comprising:
    a plug having a main portion, an end portion, and a notched portion between the main portion and the end portion;
    a socket having a proximal base end, a body portion extending from the base end, an axial, plug receiving bore opening through a distal end of the body portion, and a locking member between the base and the plug receiving bore; and
    the locking member including a leaf spring cantilevered axially on one side of the body portion of the socket and supporting a latch bar to engage the notched portion of the plug when the plug is inserted through the open end of the plug receiving bore, the latch bar being spaced from the leaf spring so that the end portion of the plug passes between the latch bar and the leaf spring when the plug is inserted through the open end of the plug receiving bore;

wherein body portion includes a top curved wall and a bottom curved wall, the curved walls connecting the parallel side walls to form the plug receiving bore and a plurality of traverse walls extending between the parallel side walls along an outer surface of the top curved wall and an outer surface of the bottom curved wall.

9. The coupling device of claim 3, wherein the pair of arms are arranged substantially parallel to each other in an axial direction and extend away from the leaf spring in an axial direction slanting toward the plug receiving bore.

10. The coupling device of claim 1, wherein the latch bar extends toward the leaf spring in an axial direction slanting toward the plug receiving bore.

11. The coupling device of claim 1, wherein an outer surface of the main portion of the plug includes at least one longitudinal rib, and the plug receiving bore includes at least one longitudinal groove configured to receive the at least one longitudinal rib when the plug is inserted through the open end of the plug receiving bore.

12. The coupling device of claim 1, wherein the end portion of the plug has angled side walls configured to bear against the locking tab when the plug is inserted through the open end of the plug receiving bore, thereby forcing the latch bar radially outward until the locking tab engages the notched portion of the plug.

13. The coupling device of claim 1, wherein the socket and at least a portion of a rake head are a one-piece unit, and the leaf spring is delineated by a U-shape slot in the body portion.

14. The coupling device of claim 13, wherein the socket and the at least a portion of the rake head are molded of synthetic resinous material.

15. The coupling device of claim 1, wherein an outer surface of the main portion of the plug includes a plurality of longitudinal ribs, and the plug receiving bore includes a plurality of longitudinal grooves configured to receive the plurality of longitudinal ribs when the plug is inserted through the open end of the plug receiving bore, and wherein each of the plurality of longitudinal ribs is larger than each of the plurality of longitudinal grooves such that at least one of the plurality of longitudinal ribs and the plurality of longitudinal grooves deforms when the plug is inserted through the open end of the plug receiving bore, thereby providing an interference fit between the plug and the socket.

16. The coupling device of claim 1, wherein the engagement of the notched portion by the latch bar is tightened when a relative pulling force is applied to the plug or the socket.

17. A tool having a coupling device, the tool comprising:
a handle part;
a tool part; and
a coupling device connecting the handle part and the tool part, the coupling device comprising:
a plug having a main portion, an end portion, and a notched portion between the main portion and the end portion;
a socket having a proximal base end, a body portion extending from the base end, an axial, plug receiving bore opening through a distal end of the body portion, and a locking member between the base and the plug receiving bore; and
the locking member including a leaf spring cantilevered axially on one side of the body portion of the socket and supporting a latch bar to engage the notched portion of the plug when the plug is inserted through the open end of the plug receiving bore, the latch bar being spaced from the leaf spring and located on another side of the socket.

18. The tool of claim 17, wherein the plug is connected to the handle part, and the socket is connected to the tool part.

19. The tool of claim 17, wherein the plug is connected to the tool part, and the socket is connected to the handle part.

* * * * *